United States Patent [19]

Samodovitz

[11] E Patent Number: Re. 32,062

[45] Reissued Date of Patent: Jan. 14, 1986

[54] MULTIPLE FIELD ACOUSTIC FOCUSSER

[76] Inventor: Arthur J. Samodovitz, One Lakeshore Dr., Apt. A-4, Farmington, Conn. 06032

[21] Appl. No.: 529,224

[22] Filed: Aug. 29, 1983

Related U.S. Patent Documents

Reissue of:

[64] Patent No.: 4,387,599
Issued: Jun. 14, 1983
Appl. No.: 222,947
Filed: Jan. 6, 1981

[51] Int. Cl.[4] ..... G10K 11/30

[52] U.S. Cl. ..... 73/642; 181/176; 367/150; 367/155

[58] Field of Search ..... 181/176; 367/150, 153, 367/155; 73/642

[56] References Cited

U.S. PATENT DOCUMENTS

| | | | |
|---|---|---|---|
| 3,913,061 | 10/1975 | Green | 181/176 |
| 3,995,179 | 11/1976 | Flournoy et al. | 73/642 |
| 4,016,751 | 4/1977 | Kossoff | 73/641 |
| 4,097,835 | 6/1978 | Green | 367/150 |
| 4,138,895 | 2/1979 | Mezrich | 73/642 |
| 4,213,344 | 7/1980 | Rose | 73/642 |

*Primary Examiner*—Howard A. Birmiel

[57] ABSTRACT

The invention provides a highly focussed ultrasonic wave throughout a large depth of field without any mechanical motion. One embodiment of the invention providing two focussed fields includes a front to back arrangement of a converging lens, a transducer without any backing material to dissipate ultrasound, a converging lens, and a transducer. To focus in the far field, the front transducer transmits and receives via the front lens. To focus in the near field, the rear transducer transmits and receives via both lenses which collectively focus in the near field.

16 Claims, 4 Drawing Figures

MULTIPLE FIELD ACOUSTIC FOCUSSER

Matter enclosed in heavy brackets [ ] appears in the original patent but forms no part of this reissue specification; matter printed in italics indicates the additions made by reissue.

Cross reference to related applications: none. Statement as to the rights to inventions made under Federally-sponsored research and development: none.

BACKGROUND OF THE INVENTION

1. Field of the Invention

The invention relates to transducers, and more particularly to a plurality of alternately layered transducing elements and acoustical lenses for use in focussing acoustical waves at different colinear regions without any mechanical motion.

2. Description of the Prior Art

Ultrasound is used to examine inside a specimen and produce an image. An ordinary transducer is electrically pulsed, and in response it transmits an ultrasonic (mechanical) wave. The wave passes through an acoustic lens to focus at a particular location inside the specimen. That location is determined by the focal length of the lens. The wave interacts with the specimen producing echoes, some of which reflect back onto the lens and through to the transducer. The transducer then produces electrical signals, and those which correspond to the echoes of the field are used to make an image. A highly focussed wave yields good resolution but only over a small depth of field. The quality of resolution and depth of field are inversely related according to standard lens properties.

To focus over a large depth of field, two or more lenses of different focal lengths can be interchanged mechanically to yield two or more fields. The pulse-echo procedure would be repeated for each lens whereby the echoic electrical signals corresponding to the fields would be combined to effect a large depth of field. However, interchanging lenses takes too long and requires precise alignment. The invention provides a large depth of field without any mechanical motion.

SUMMARY OF THE INVENTION

It is a first object of the invention to provide a transducer assembly which can focuss over a large depth of field yet have good resolution.

It is a second object of the invention to provide a transducer assembly which need not move in the course of transmitting highly focussed acoustic waves over a large depth of field, and need not move in receiving echoes produced from the interaction of said waves with objects within the extended depth of field.

To satisfy these objects and others, there is provided a transducing assembly comprising a first converging, acoustic lens, a first transducing element located behind the first lens, a second, converging acoustic lens located behind the first transducing element, a second transducing element located behind the second acoustic lens, a backing material located behind the second transducing element to absorb rearwardly directed waves, and means to couple the first lens to the first transducing element, the first transducing element to the second lens, and the second lens to the second transducing element via coupling mediums, matching layers, filler materials, and direct contact between layers.

The invention focusses in the far field by transmitting and receiving with the first transducing element, and the invention focusses in the near field by transmitting and receiving with the second transducing element: the far field focussing is effected by the focussing power of the first lens, and the near field focussing is effected by the focussing power of the first lens in conjunction with the focussing power of the second lens.

DESCRIPTION OF THE PREFERRED EMBODIMENT

Figure 1:
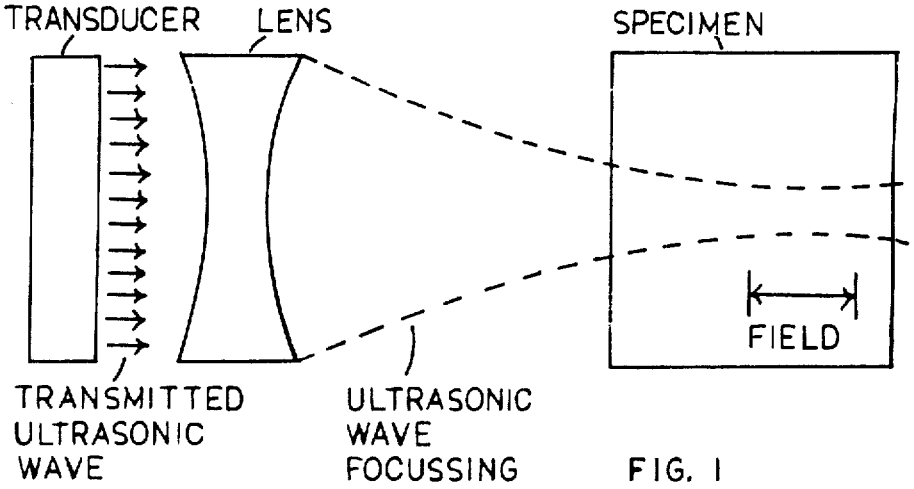
FIG. 1 is a cross-sectional diagram of a simple transducer-lens assembly. The transducer lens, and specimen are interfaced through a coupling medium.
Figure 2:
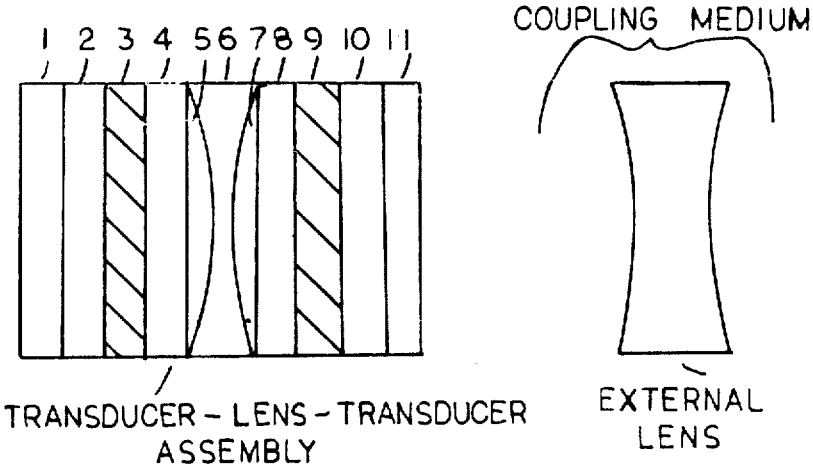
FIG. 2 is a cross-sectional diagram not drawn to scale of the first embodiment of the invention comprising a transducer-internal lens-transducer assembly, an external lens, and a coupling medium which interfaces said assembly, external lens, and the specimen.

The first embodiment of the invention comprises elements shown in FIG. 2: a transducer-internal lens-transducer assembly, an external lens, and a coupling medium which interfaces said assembly, external lens, and the specimen. Said assembly comprises eleven section: section 1 is material(s) to absorb and dissipate any ultrasound which impinges on it, section 2 is a thin electrode, section 3 is a piezoelectric material, section 4 is a thin electrode, section 5 is a material to fill the gap between the flat section 4 and the concave internal lens, and has the same acoustic impedance as the piezoelectric material of section 3 and the internal lens, section 6 is the converging lens, section 7 is the same as section 5, section 8 is the same as section 4, section 9 is the same as section 3, section 10 is the same as section 2, and section 11 is material(s) to match the acoustic impedance of the piezoelectric section 9 to that of water whereby ultrasound passes from said assembly to water with minimal losses and minimal reflections.

Figure 3A:
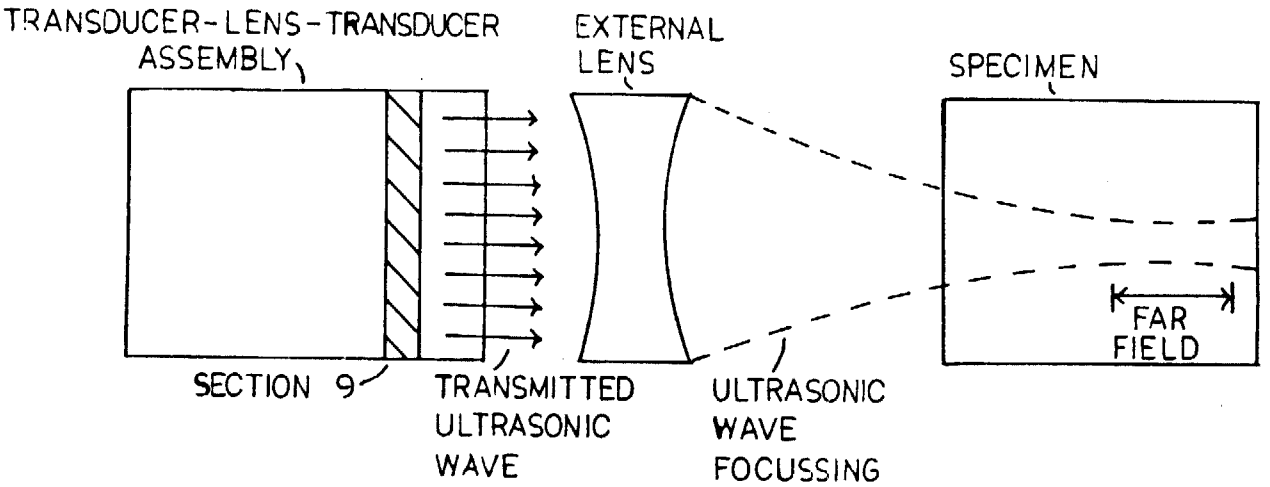
FIG. 3(a) is a cross-sectional diagram, not drawn to scale, demonstrating the far field focussing ability of the preferred embodiment of the invention.
Figure 3B:
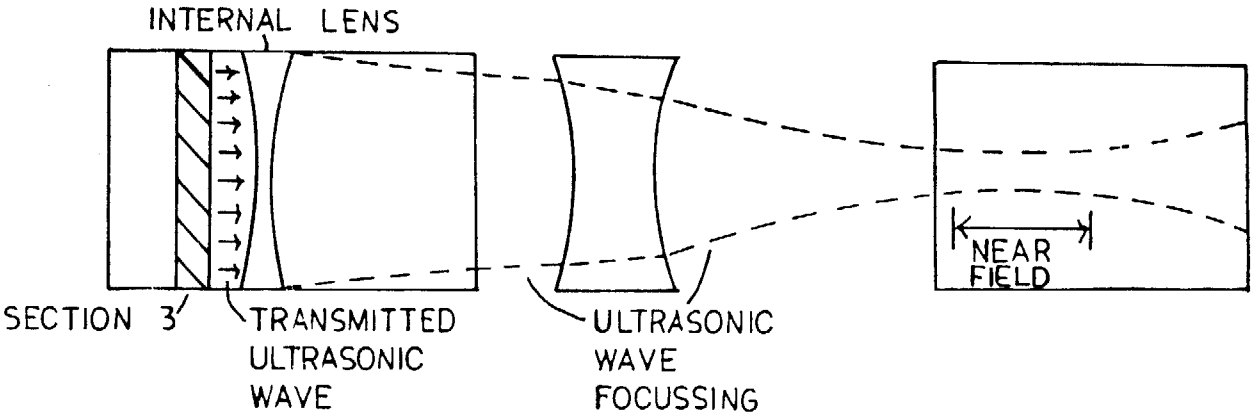
FIG. 3(b) is a cross-sectional diagram, not drawn to scale, demonstrating the near field focussing ability of the preferred embodiment of the invention.

To focus in the far field, electrodes section 8 and 10 are electrically pulsed. In response, piezoelectric section 9 transmits a forward acoustic wave towards the specimen, and a backward acoustic wave towards the absorptive section 1. The backward wave travels from section 8 to section 1 with minimal reflections since sections 9, 7, 6, 5, and 3 have the same acoustic impedance, electrode sections 8,4, and 2 are thin, and section 1 absorbs and dissipates the wave. The forward wave passes through the electrode section 10, matching section 11, the coupling medium, the external lens, and the coupling medium and into the specimen. The wave focusses at a location determined by the focal length of the external lens as shown in FIG. 3, and that location is the far field. The forward wave interacts with the specimen producing echoes. Some of these echoes reflect back onto the external lens and proceed through sections 11 and 10, and to piezoelectric section 9. In response, piezoelectric section 9 generates an electrical signal between electrode sections 8 and 10 which is transmitted electrically to an electronic unit. The electronic unit processes the segment of this signal which corresponds to the far field. The echoes, reduced in power, proceed through piezoelectric section 9, and sections 8–2, and dissipate in section 1.

To focus in the near zone, electrode sections 2 and 4 are electrically pulsed. Piezoelectric section 3 transmits a forward acoustic wave towards the specimen, and a backward acoustic wave towards the absorptive section 1. The backward wave travels through electrode section 2 and is dissipated in section 1. The forward wave passes through sections 4–11, the coupling medium, the external lens, and the coupling medium, and into the specimen. The focal length (Ft) is determined by the focal length of the internal lens (Fi) in conjunction with that of the external lens (Fe):

$$1/Ft = 1/Fi + 1/Fe,$$

and is shown in FIG. 3. The forward wave interacts with the specimen producing echoes. Some of these echoes reflect back onto the external lens and proceed through sections 11–4 and to the piezoelectric section 3. In response, piezoelectric section 3 generates an electrical signal between electrode sections 2 and 4 which is transmitted electrically to the electronic unit. The electronic unit processes the segment of this signal which corresponds to the near field. The echoes, reduced in power, proceed through piezoelectric section 3 and section 2, and dissipate in section 1. The electronic unit combines the processed electrical signals of both piezoelectric sections to produce a focussed image over a large depth of field.

As the forward wave of piezoelectric section 3, and resulting echoes pass through piezoelectric section 9, some mechanical energy is lost as they produce electrical energy. This loss is decreased if electrode sections 8 and 10 are open circuited.

DESCRIPTION OF THE SECOND EMBODIMENT OF THE INVENTION

The second embodiment of the invention is similar to the first except the acoustic impedance of the internal lens and surrounding two filler material sections is different from that of the piezoelectric materials, and a section to match them is required immediately before section 5 and immediately after section 7. The second embodiment of the invention is functionally equivalent to the first embodiment.

OTHER EMBODIMENTS OF THE INVENTION

In any embodiment of the invention, the internal lens may be larger in diameter than the other sections of the transducer-lens-transducer assembly to avoid difraction at the perimeter of the lens. Also, the internal lens may be divergent which would cause the rear piezoelectric material to focus in the farthest field. In these latter embodiments, the diameter of the rear piezoelectric section should be smaller than the rest of the assembly so that the forward wave does not collide with the cylindrical surface of the assembly.

Any embodiment of the invention is expandable to focus in three (or more) fields. In the first embodiment, section 11 is removed and another unit similar to sections 5–11 is added onto section 10 connected at the new section 5. The forward wave from the added piezoelectric section focusses in the farthest field, that from the middle one focusses in the middle field, and that from the rear one focusses in the near field.

OTHER PROCEDURES FOR OPERATING ANY EMBODIMENT OF THE INVENTION

The preferred procedure for operating the first embodiment of the invention requires up to twice the time as a simple transducer-lens arrangement. To operate in less time, the first embodiment transmits once with piezoelectric section 9, and receives with piezoelectric sections 9 and 3. The electronic unit processes the segment of the electrical signal from section 9 that corresponds to the far field, and that from section 3 which corresponds to the near field. This procedure yields resolution in the far field as good as that of the preferred procedure, but resolution in the near field intermediate in quality between that of the preferred procedure and that of the simple one transducer-one lens system operating comparably outside its field.

Any embodiment of the invention may be operated to produce a B-scan. The operation begins with any said operational procedure. Then the invention is mechanically moved to focus and operate in an adjacent coplanar field. The invention is moved and operated again and again until a sufficiently large plane has been scanned.

What is claimed is:

1. An ultrasonic apparatus for focussing ultrasonic waves comprising the following acoustical lenses and transducing elements located in order along an axis:

a first acoustical lens, a first transducing element, a second acoustical lens, and a second transducing element, and further comprising means for coupling the first lens to the first transducing element, the first transducing element to the second lens, and the second lens to the second transducing element so that ultrasonic waves can propagate from the first lens, to the first transducing element, to the second lens, and to the second transducing element.

2. The apparatus recited in claim 1 wherein the first transducing element is parallel to the second transducing element.

3. The apparatus recited in claim 1 wherein the first transducing element is coaxial with the second transducing element.

4. The apparatus recited in claim 1 further comprising electrodes attaching to the first and second transducing elements.

5. The apparatus recited in claim 1 wherein the coupling means comprise:

matching means located between the first lens and the first transducing element, and matching the acoustical impedance of the first lens to the acoustical impedance of the first transducing element.

6. The apparatus recited in claim 1 wherein the coupling means comprise:

matching means located between the first transducing element and the second lens, and matching the acoustical impedance of the first transducing element to the acoustical impedance of the second lens, and matching means located between the second lens and the second transducing element, and matching the acoustical impedance of the second lens to the acoustical impedance of the second transducing element.

7. The apparatus recited in claim 1 wherein the second transducing element has a back located along said axis, facing away from the second lens, and said apparatus further comprises means for absorbing and dissipating ultrasonic waves, said absorbing and dissipating means located along said axis in back of the second transducing element.

8. The apparatus recited in claim 7 wherein the coupling means comprise:

matching means located between the first lens and the first transducing element, and matching the acoustical impedance of the first lens to the acoustical impedance of the first transducing element, matching means located between the first transducing element and the second lens, and matching the acoustical impedance of the first transducing element to the acoustical impedance of the second lens, and matching means located between the second lens and the second transducing element and matching the acoustical impedance of second lens to the acoustical impedance of the second transducing element, and said apparatus further comprises electrodes attaching to the first and second transducing elements.

9. An ultrasonic apparatus for focussing ultrasonic waves comprising the following lenses, transducing elements, and absorbing and dissipating means located in order along an axis:

a first acoustical lens, a first transducing element, a second acoustical lens, a second transducing element, a third acoustical lens, a third transducing element, and means for absorbing and dissipating ultrasonic waves, and further comprising electrodes attaching to the first, second, and third transducing elements, and means for coupling the first acoustical lens to the first transducing element, the first transducing element to the second acoustical lens, the second acoustical lens to the second transducing element, the second transducing element to the third acoustical lens, and the third acoustical lens to the third transducing element so that ultrasonic waves can propagate from the first acoustical lens, to the first transducing element, to the second acoustical lens, to the second transducing element, to the third acoustical lens, and to the third transducing element.

*10. A unitary apparatus for focussing acoustic waves comprising:*

*a first acoustic lens,*

*a first piezoelectric element,*

*a second acoustic lens, and*

*a second piezoelectric element, said acoustic lenses and said piezoelectric elements located in order and situated such that one line can intersect opposite faces of each acoustic lens and each piezoelectric element, said first acoustic lens focussing acoustic waves produced by said first piezoelectric element, and said first and second acoustic lenses collectively focussing acoustic waves produced by said second piezoelectric element.*

*11. The apparatus of claim 10 wherein the first piezoelectric element is parallel to the second piezoelectric element.*

*12. The apparatus of claim 10 further comprising electrodes attaching to said opposite faces of the first and second piezoelectric elements.*

*13. The apparatus of claim 10 wherein said face of the second piezoelectric element located on said line, facing away from the second lens is the back, and*

*said apparatus further comprises means for absorbing and dissipating acoustic waves, said absorbing and dissipating means located on said line in back of the second piezoelectric element.*

*14. A unitary apparatus providing a large depth of field for acoustic waves comprising:*

*a first acoustic lens,*

*a first piezoelectric element,*

*a second acoustic lens, and*

*a second piezoelectric element, said piezoelectric elements being substantially coaxial, and said acoustic lenses and said piezoelectric elements being arranged in order and being coupled to one another such that acoustic waves can readily pass from the first acoustic lens, to the first piezoelectric element, to the second acoustic lens, and to the second piezoelectric element, said first and second acoustic lenses focussing acoustic waves proceeding toward said second piezoelectric element.*

*15. The apparatus of claim 14 further comprising electrodes attaching to opposite faces of the first and second piezoelectric elements, said opposite faces being coaxial with the piezoelectric elements.*

*16. The apparatus of claim 14 wherein said second piezoelectric element has a back located on said axis, facing away from said second lens, and*

*said apparatus further comprises means for absorbing and dissipating acoustic waves, said absorbing and dissipating means located on said axis in back of said second piezoelectric element.*

* * * * *